US012755370B2

(12) United States Patent
Raveh

(10) Patent No.: US 12,755,370 B2
(45) Date of Patent: Oct. 6, 2026

(54) AUTOMATIC OPTICAL INSPECTION USING HYBRID IMAGING SYSTEM

(71) Applicant: Orbotech Ltd., Yavne (IL)

(72) Inventor: Gonen Raveh, Timorim (IL)

(73) Assignee: Orbotech Ltd., Yavne (IL)

( * ) Notice: Subject to any disclaimer, the term of this patent is extended or adjusted under 35 U.S.C. 154(b) by 372 days.

(21) Appl. No.: 18/273,269

(22) PCT Filed: Feb. 21, 2022

(86) PCT No.: PCT/IL2022/050201
§ 371 (c)(1),
(2) Date: Jul. 19, 2023

(87) PCT Pub. No.: WO2022/180625
PCT Pub. Date: Sep. 1, 2022

(65) Prior Publication Data

US 2024/0112325 A1 Apr. 4, 2024

Related U.S. Application Data

(60) Provisional application No. 63/152,355, filed on Feb. 23, 2021.

(51) Int. Cl.
*G06T 7/00* (2017.01)
*G06T 5/50* (2006.01)
*G06T 5/60* (2024.01)

(52) U.S. Cl.
CPC ................ *G06T 7/001* (2013.01); *G06T 5/50* (2013.01); *G06T 5/60* (2024.01);
(Continued)

(58) Field of Classification Search
CPC ........... G06T 5/50; G06T 5/60; G06T 7/0002; G06T 7/0004; G06T 7/001;
(Continued)

(56) References Cited

U.S. PATENT DOCUMENTS 10,599,951 B2 3/2020 Bhaskar et al.
11,436,702 B2 * 9/2022 Yang .......................... G06T 5/50
(Continued)

FOREIGN PATENT DOCUMENTS

CN 109074650 A 12/2018
CN 110189288 A 8/2019
(Continued)

OTHER PUBLICATIONS

TIPO, Office Action issued for ROC (Taiwan) Patent Application No. 111101007, Feb. 8, 2025.
(Continued)

*Primary Examiner* — Scott A Rogers
(74) *Attorney, Agent, or Firm* — Hodgson Russ LLP

(57) ABSTRACT

A method, product and system for Automatic Optical Inspection (AOI) using hybrid imaging system, The method comprises obtaining a prediction model that is configured to predict enhanced-quality images of products based on a low-quality images of the products, wherein the prediction model is generated based images obtained by a dual-scanning system comprising a low-quality scanning system and a high-quality scanning system. Based on a low-quality image of the product that is captured using the low-quality scanning system and using the prediction model, an enhanced-quality image of the product is predicted and utilized for defects detection.

19 Claims, 4 Drawing Sheets

(52) U.S. Cl.
CPC ............... *G06T 2207/20081* (2013.01); *G06T 2207/20084* (2013.01); *G06T 2207/30121* (2013.01); *G06T 2207/30141* (2013.01)

(58) Field of Classification Search
CPC . G06T 2207/20081; G06T 2207/20084; G06T 2207/30141; G06T 2207/30148; G06T 2207/30121; H01L 21/67; H01L 21/67005; H01L 21/67242; H01L 22/00; H01L 22/10; H01L 22/12; H01L 22/24
See application file for complete search history.

(56) References Cited

U.S. PATENT DOCUMENTS

| | | | | |
|---|---|---|---|---|
| 12,211,191 | B2 * | 1/2025 | Ge | G06T 7/0002 |
| 2017/0132528 | A1 * | 5/2017 | Aslan | G06N 20/00 |
| 2017/0161884 | A1 | 6/2017 | Chen et al. | |
| 2017/0193680 | A1 | 7/2017 | Zhang et al. | |
| 2017/0345140 | A1 | 11/2017 | Zhang et al. | |
| 2018/0240225 | A1 | 8/2018 | Harada et al. | |
| 2019/0004504 | A1 | 1/2019 | Yati | |
| 2019/0257767 | A1 | 8/2019 | Shaubi et al. | |
| 2019/0286541 | A1 | 9/2019 | Sobala et al. | |
| 2019/0303717 | A1 | 10/2019 | Bhaskar et al. | |
| 2019/0378012 | A1 | 12/2019 | Tripodi et al. | |
| 2020/0018944 | A1 | 1/2020 | Fang et al. | |
| 2020/0090304 | A1 | 3/2020 | Leem et al. | |
| 2020/0097850 | A1 * | 3/2020 | Bae | G06N 3/0464 |
| 2020/0211178 | A1 | 7/2020 | Zhou et al. | |
| 2024/0354371 | A1 * | 10/2024 | Olsen | G06T 3/4076 |
| 2025/0245784 | A1 * | 7/2025 | Ouchi | G06T 5/50 |

FOREIGN PATENT DOCUMENTS

| | | | | |
|---|---|---|---|---|
| CN | 110895808 | A | 3/2020 | |
| CN | 111819676 | A | 10/2020 | |
| CN | 112424903 | A | 2/2021 | |
| CN | 113272820 | A | 8/2021 | |
| CN | 115170483 | B * | 8/2025 | G06V 10/774 |
| JP | 2016110290 | A | 6/2016 | |
| JP | 2018097731 | A | 6/2018 | |
| JP | 2018137275 | A | 8/2018 | |
| JP | 2019522897 | A | 8/2019 | |
| TW | 201734895 | A | 10/2017 | |
| WO | 2020009749 | A1 | 1/2020 | |
| WO | WO-2024088665 | A1 * | 5/2024 | G03F 7/706841 |

OTHER PUBLICATIONS

WIPO, Search Report for PCT/IL2022/050201, May 29, 2022.

JPO, Office Action issued for JP Patent Application No. 2023-546061, Jul. 1, 2025.

CNIPA, Office Action issued for PRC (China) Patent Application No. 202280008415.6, Jul. 25, 2025.

China Intellectual Property Administration Office, Office Action issued in corresponding application No. 202280008415.6, dated: Dec. 4, 2025, 18 pages including translation.

Wang, Weijia "How Machine Cognition Can Disrupt Business and Society," Seminar at Southern University of Science and Technology, pp. 80-86.

* cited by examiner

AUTOMATIC OPTICAL INSPECTION USING HYBRID IMAGING SYSTEM

TECHNICAL FIELD

The present disclosure relates to automatic optical inspection in general, and to automatic optical inspection that is implemented using hybrid imaging system, in particular.

BACKGROUND

Automated Optical Inspection (AOI) is an automated visual inspection of outputs of a production process. Automated Optical Inspection may be implemented, for example, in Flat Panel Displays (FPD) manufacture, in Printed Circuit Board (PCB) manufacture, or the like.

Automated Optical Inspection may utilize a camera that autonomously scans the device under test for both catastrophic failure (e.g. missing component) and quality defects (e.g. fillet size or shape or component skew). Automated Optical Inspection may be is a non-contact test method, and therefore pose a reduced risk to harm the product itself. Automated Optical Inspection may be implemented at many stages through the manufacturing process including bare board inspection, Solder Paste Inspection (SPI), pre-reflow and post-reflow, or the like.

BRIEF SUMMARY

One exemplary embodiment of the disclosed subject matter is a method comprising: obtaining a prediction model, wherein the prediction model is configured to predict enhanced-quality images of products based on a low-quality images of the a products, wherein the prediction model is generated based on pairs of images obtained by a dual-scanning system comprising a low-quality scanning system and a high-quality scanning system; utilizing the low-quality scanning system to capture a low-quality image of a product; predicting, based on the low-quality image of the product and using the prediction model, an enhanced-quality image of the product, wherein the enhanced-quality image has a higher quality than a quality of the low-quality image; and performing defects detection on the enhanced-quality image, whereby detecting defects without utilizing the high-quality scanning system.

Optionally, the low-quality scanning system is faster than the high-quality scanning system, whereby detecting defects at shorter time in comparison to defect detection that is based on high-quality images obtained using the high-quality scanning system.

Optionally, said utilizing, said predicting and said performing the defects detection is performed by a student module, wherein the student module comprising the low-quality scanning system and devoid of the high-quality scanning system.

Optionally, said utilizing, said predicting and said performing the defects detection is performed by a teacher module, wherein the teacher module comprising the dual-scanning system comprising the low-quality scanning system and the high-quality scanning system.

Optionally, the method further comprising the teacher module performing results evaluation of the defects detection, wherein said performing results evaluation comprising: utilizing the high-quality scanning system to capture a high-quality image of the product; performing defects detection on the high-quality image; and comparing results between said performing defects detection on the high-quality image and said performing defects detection on the enhanced-quality image.

Optionally, said comparing results comprises identifying substantial difference between defects detected using the high-quality image and defects detected using the enhanced-quality image.

Optionally, said identifying substantial difference comprises determining lack of substantial difference in response to detecting two different non-empty sets of defects.

Optionally, the method further comprising in response to determining a difference in the results, adding the low-quality image and the high-quality image to a training dataset to be used for re-training the prediction model.

Optionally, said obtaining the prediction model comprises: obtaining a set of pairs of low-quality and high-quality images of products, obtained using the dual-scanning system, wherein said obtaining the set of pairs is performed at a customer site; and training the prediction model using the set of pairs of low-quality and high-quality images of products, whereby generating the prediction model; wherein said utilizing the low-quality scanning system to capture the low-quality image of the product is performed at the customer site.

Optionally, the enhanced-quality image has a lower quality than a quality of images obtained by the high-quality scanning system.

Another exemplary embodiment of the disclosed subject matter is a computer program product comprising a non-transitory computer readable storage medium retaining program instructions, which program instructions when read by a processor, cause the processor to perform: obtaining a prediction model, wherein the prediction model is configured to predict enhanced-quality images of products based on a low-quality images of the products, wherein the prediction model is generated based on pairs of images obtained by a dual-scanning system comprising a low-quality scanning system and a high-quality scanning system; utilizing the low-quality scanning system to capture a low-quality image of a product; predicting, based on the low-quality image of the product and using the prediction model, an enhanced-quality image of the product, wherein the enhanced-quality image has a higher quality than a quality of the low-quality image; and performing defects detection on the enhanced-quality image, whereby detecting defects without utilizing the high-quality scanning system.

Yet another exemplary embodiment of the disclosed subject matter is a system comprising: one or more teacher modules, wherein each teacher module comprising a dual-scanning system comprising a low-quality scanning system and a high-quality scanning system configured to obtain low-quality and high-quality images of a scanned a product, respectively; a plurality of student modules, wherein each student module comprising the low-quality scanning system; a model generator configured to generate a prediction model, wherein the prediction model is configured to predict; based on a low-quality image of a product, an enhanced-quality image of the product, wherein the enhanced-quality image has a higher quality than a quality of the low-quality image; and a defects detector configured to detect defects using automated optical inspection of an image of products, wherein said defects detector is configured to detect defects in enhanced-quality images predicted by the prediction model.

Optionally, a number of said one or more teacher modules is smaller than a number of the plurality of student modules.

Optionally, said one or more teacher modules and said plurality of student modules are deployed at a customer site.

Optionally, the low-quality scanning system is faster than the high-quality scanning system.

Optionally, said one or more teacher modules are configured to be utilized for gathering a training dataset to be used by said model generator, wherein said plurality of student modules are configured to be utilized for performing the automated optical inspection using images obtained by the low-quality scanning system.

Optionally, said one or more teacher modules are configured to be utilized for performing the automated optical inspection using images obtained by the low-quality scanning system and without utilizing the high-quality scanning system.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like a components. Unless indicated otherwise, the drawings provide exemplary embodiments or aspects of the disclosure and do not limit the scope of the disclosure. In the drawings:

FIGS. 2A-4B show flowchart diagrams of methods, in accordance with some exemplary embodiments of the disclosed subject matter;

FIG. 4 shows an illustration of a computerized environment, in accordance with some exemplary embodiments of the disclosed subject matter.

DETAILED DESCRIPTION

Figure 1:
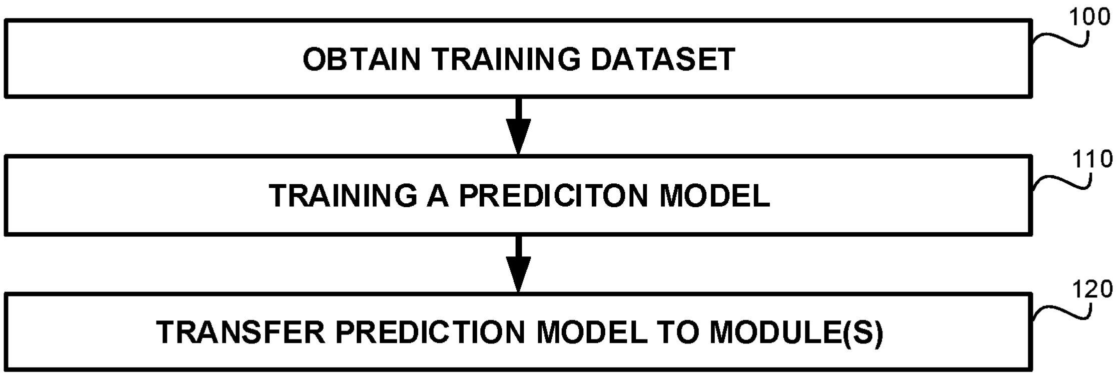
FIG. 1 shows a flowchart diagram of a method, in accordance with some exemplary embodiments of the disclosed subject matter.

One technical problem dealt with by the disclosed subject matter is to provide an AOI system with high quality results, while using hardware of reduced costs and quality. Additionally, or alternatively, it may be desired to provide an AOI system that can speed-up the inspection process, increasing the overall number of products the system can inspect in a predetermined time window.

One technical solution provided by the disclosed subject matter may comprise of a hybrid AOI system. The hybrid AOI system may include a teacher module and a student module. The teacher module may comprise a high-quality scanning system and a low-quality scanning system, while the student module may comprise the low-quality scanning system and may not include the high-quality scanning system.

In some exemplary embodiments, the high-resolution scanning system and the low-resolution scanning system may be a high-end and a low-end imaging hardware, respectively, cameras capable of acquiring high resolution images and low-resolution images, respectively, or the like. In some exemplary embodiments, the high-quality scanning system may be, for example, a video sensor, while the low-quality scanning system may be an optical scanner. In some exemplary embodiments, the high-quality scanning system may be capable of acquiring a pixel value for a small pixel size, while the low-quality scanning system may be capable of acquiring value for pixels of larger size. As an example, the difference in pixel sizes may be in an order of magnitude, such as the larger pixel size may be about five times larger than the small pixel size, about ten times larger, about twenty times larger, or the like. It will be noted that the terms low-quality and high-quality are relative to each other, and while the low-quality scanning system may be of lower quality than the high-quality scanning system, it may produce images that are considered, in absolute terms, as high quality such as 300 Dots Per Inch (DPI), 2540 DPI, 4000 DPI, 8000 DPI, or the like. As another example, the low-quality scanning system may utilize scanning equipment that is configured to acquire High Definition (HD) video, such as 720p, 1080p, 4K, 8K, Ultra HD, or the like.

In some exemplary embodiments, the high-quality scanning system may have a scanning speed that is slower than that of the low-quality scanning system. In some exemplary embodiments, the scanning speed may include physical scanning time, time to acquire the digital image of the scanned product, or the like. Lower resolution images may have reduced amount of information, and accordingly may be obtained in memory faster than high resolution images. Additionally, or alternatively, reduced image resolution may also require reduced amount of digital storage, in view of the reduced information represented therein.

In some exemplary embodiments, a teacher module may be deployed in a production process, such as in a factory, in a production plant, or the like. The teacher module may acquire images associated with a customer site of both the high-quality scanning images and the low-quality scanning images. Using machine learning techniques, image to image mapping between the low-quality image and the high-quality image may be performed. For example, and without loss of generality, a deep learning using Artificial Neural Networks (ANN) may be utilized to enable prediction of high-resolution image based on low-resolution image, such as Pix2Pix, Generative Adversarial Network (GAN), Conditional GAN, CycleGAN™, or the like.

In some exemplary embodiments, the teacher module may obtain a relatively large dataset of sets of pairs of low-resolution image and high-resolution image of the same product. The relatively large dataset may comprise, for example, over 10,000 sets of pairs, over 50,000 sets of pairs, over 100,000 sets of pairs, over 500,000 sets of pairs, over 1,000,000 sets of pairs, or the like. The pairs of images may be taken at the same position of the imaged product (e.g., PCB, FPB, or the like), so that the object is aligned.

After the training stage is concluded, a prediction model is generated and can be used. It is noted that the prediction model may be trained to predict an image that has intermediate quality that is higher than the provided by the low-quality scanning module and lower than higher than provided by the high-quality scanning module. For example, assuming the low-quality scanning system may have a pixel size of 5 micron and the high-quality scanning system may have a pixel size of 0.5 micron, the prediction model may be configured to predict an image of pixel size between 1 micron and 3 micron, between 1.25 micron and 2.5 micron, or the like.

In some exemplary embodiments, the training dataset may be obtained in production, such as in the customer site, using real examples. As each customer site may tend to have similar products, e.g., produced by the same hardware, with similar characteristics, or the like, the site-specific training dataset may provide for a basis for training the predication model to achieve relatively high accuracy in its predictions.

In some exemplary embodiments, a student module may be employed in production to acquire low-resolution images only. Such images are fed to the prediction a module to predict an enhanced-quality image, such as having intermediate quality. Enhanced quality images may be provided to the optical scanning defect detection algorithm to identify defect. Defect detection that is based on predicted enhanced-quality image may be referred to as Artificial Intelligence (AI)-based detection process.

In some exemplary embodiments, a teacher module may be employed in production in a similar manner to a student module to perform AI-based detection process, while utilizing the low-quality scanning system only and without using the high-quality scanning system.

Additionally or alternatively, the teacher module may be utilized for evaluation purposes. It is noted that prediction quality of such models may be affected by several elements, such as changes in the imaging techniques, degradation of the sensors, changes in the lighting conditions, changes in the customer process, using different materials, changes in the data-generation processes, changes in the generated product, or the like. As an example, in FPD or PCB manufacture, image pixels may be changed due to changes in the color of the manufactured FPD or PCB, due to using different material in the production, or the like. Such changes may affect the reflectance, transmittance, or the like, of the images to be classified. As another example, in FPD or PCB manufacture, rapid changes, even though miniature, may be continuously performed on the generated products, such as for adapting the products to customer needs, adapting to new design features, or the like. As a result, image prediction may require improvement and update over time. In order to identify when the enhanced-quality image should not be relied on, evaluation may be performed. The evaluation may comprise scanning a sample using both the low-quality scanning system and the high-quality scanning system, and determining whether defects identified using the enhanced quality image, which is based on the low-quality scanning system, are identical to those identified based on the products of the high-quality scanning system. In case the evaluation process identifies that defects go undetected, usage of the prediction model may be halted until it is improved and can be used in achieving sufficiently high accuracy threshold (e.g., less than 1 errors per 1 million samples, for 1 million samples, each defective item is detected with at least one defect (even if differs from the true defects), or the like. As an example, the customer may define that an error of up to 0.05%, 0.1%, 0.15% or the like of true defects may go undetected. Once evaluation under-performs with respect to such user-defined threshold, the prediction model may be retrained before it is reused. In some exemplary embodiments, in case the evaluation identifies a problem, the data obtained during the evaluation, and specifically data that was associated with a different defect detection, can be utilized for re-training the prediction model.

It is noted that during evaluation, in some cases, different defect detections may be considered acceptable. As an example, if a defect is identified, the product may be discarded. In such a case, it may be sufficient that the AI-based detection would correctly classify a defective/non-defective product, even if it identifies incorrect defects, incorrect number of defects, or the like. However, for re-training purposes, even pairs of low-resolution and high-resolution images in which the classification was correct, but the AI-based detection failed to correct detect all defects (and only detected correct defects), may be utilized for the re-training to improve the accuracy the AI-based detection process. In some exemplary embodiments, the re-training may be performed using adaptive training.

One technical effect of utilizing the disclosed subject matter may be to enhance system capabilities of AOI machines with a low-quality scanning system using AI analysis. In some cases, teacher modules may be more expensive and less available than the cheaper, and more widely available, student modules. Using the disclosed subject matter, a single teacher module can be utilized together with a plurality of student modules that rely on the prediction model generated using the single teacher module.

Another technical effect of utilizing the disclosed subject matter may be to improve scanning speed by the AOI system. In some cases, the speed may be improved by increasing the number of devices, such as by introducing additional teacher modules. Additionally or alternatively, the speed may be improved by improving the speed of the teacher module having dual scanning systems (high-quality scanning system and low-so quality scanning system), by utilizing the low-quality scanning system to quickly scan products and utilize AI-based detection without activating the slower, but higher quality, high-quality scanning system.

Yet another technical effect of utilizing the disclosed subject matter is providing for a training process that is disconnected from external computing and databases and adapted to the customer site conditions. The disclosed subject matter enables enhancing the accuracy of enhanced quality images, without exposing data of the factory or the production plant utilizing the AI-based detection, to the developer of the AOI system or to any other external party.

Yet another technical effect of utilizing the disclosed subject matter is reducing the Time To Market (TTM) required from a product being conceived until its being available for sale. TTM may be important in industries where products are outmoded quickly, especially in the world of micro-electronics, such as in FPD, PCB, or the like. TTM may be reduced in view of a larger number of modules that can be employed, per the same budget. Additionally or alternatively, TIM may be reduced by increasing the scanning speed of dual systems, such as the teacher module.

The disclosed subject matter may provide for one or more technical improvements over any pre-existing technique and any technique that has previously become routine or conventional in the art. Additional technical problem, solution and effects may be apparent to a person of ordinary skill in the art in view of the present disclosure.

Referring now to FIG. 1 showing a flowchart diagram of a method, in accordance with some exemplary embodiments of the disclosed subject matter.

On Step 100, a training dataset is obtained. In some exemplary embodiments, the training dataset may comprise pairs of images—a low-quality image and a high-quality image of the same product, also denoted as (low, high). In some exemplary embodiments, the low-quality image may be obtained using a low-quality scanning system which scans a product and the high-quality image may be obtained using a high-quality scanning system which scans the same product. In some exemplary embodiments, the two images may be aligned to match one another. It is noted that as the sensors use to capture the images may be installed in the same device, also referred to as teacher module, but located in different locations, positioned with a different angle, or the like. In some exemplary embodiments, one image may pre-processed to be aligned with the other image. For example, the low-quality image may be transformed, such as using one or more linear transformations, to the position depicted in the high-quality image. As another example, the high-quality image may be transformed so as to match the position in the low-quality image. It is noted that the transformation to be applied may be determined automatically or manually. The transformation may be consistent for each teacher module (or type thereof). In some exemplary embodiments, the transformation may be predetermined and based on the installation parameters of the sensors, such as location within the module, distance therebetween, viewing angles, or the like.

In some exemplary embodiments, (low, high) pairs may be obtained by the teacher module in the customer site. Additionally or alternatively, the training dataset may be aggregated from a plurality of deployed teacher modules at the same site. It is noted that in some cases, each different site may have different characteristic of its electronic products. Accordingly, training datasets for each site may be different and include samples from the same site or from sites whose products share the same characteristics.

In some exemplary embodiments, the training dataset may comprise dataset obtained at the customer site, representing the electronic products produced in the customer site and analyzed by the AOI system. Additionally or alternatively, the training dataset may be comprise of an initial basic dataset which may be provided by the manufacturer of the teacher module, representing general use-cases of the AOI system.

On Step 110, the training dataset of Step 100 may be utilized for training a prediction model. In some exemplary embodiments, the training may be performed on-premise by the teacher module. Additionally or alternatively, the training may be performed on-premise by a different device, such as a server, a computer, or the like. Additionally or alternatively, the training may be performed in a remote location, such as in the cloud, by a remote server, using a cloud-computing platform, or the like. The training may be of a model, such as decision tree-based model, ANN-based model, a deep convolutional neural network, or the like. In some exemplary embodiments, the training may be based on techniques such as but not limited to Pix2Pix™, Generative Adversarial Network (GAN), Conditional GAN, CycleGAN™, or the like.

On Step 120, the prediction model generated on Step 110 may be transferred to modules to be used for AOI based on low-quality scanning systems. In some exemplary embodiments, the prediction model may be transferred to student modules that operate in the same site from which the training dataset was obtained. Additionally or alternatively, the prediction module may be transferred to one or more teacher modules, such as teacher modules which were used to gather the training dataset. The teacher modules may utilize the prediction model for performing AOI based on low-quality scanning systems, and without employing their high-quality scanning systems. Additionally or alternatively, one or more teacher modules may evaluate the performance of the prediction model. In some exemplary embodiments, evaluation may be performed over time to ensure that the AI-based detection process provides sufficiently accurate results.

Figure 2A:
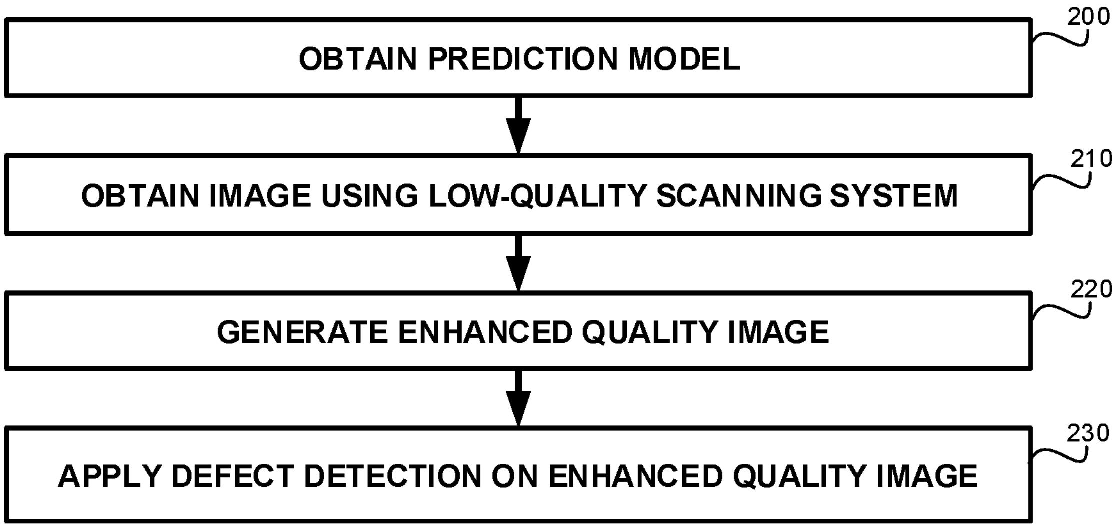

Referring now to FIG. 2A showing a flowchart diagram of a method, in accordance with some exemplary embodiments of the disclosed subject matter. The method of FIG. 2A may be performed by a computerized system comprising a low-quality scanning system, such as a student module. Additionally or alternatively, the method of FIG. 2A may be performed by a computerized system having a dual quality scanning system (e.g., a high-quality scanning system and a low-quality scanning system), such as a teacher module. In such a case, the computerized system may avoid utilizing both scanning systems and rely solely on the low-quality scanning system.

On Step 200, the prediction model is obtained. The prediction model may be obtained after the prediction model was generated in FIG. 1. In some exemplary embodiments, the prediction model may be obtained by receiving the model over a computerized communication medium, such as wired connection, wireless connection, computerized network, or the like. Additionally or alternatively, the prediction model may be obtained from local storage. The prediction model may be generated in the same device (e.g., in case of a teacher module), or in another device (such as a different teacher module, a server, a cloud-computing platform, or the like).

On Step 210, an image is obtained using the low-quality scanning system. In some exemplary embodiments, the low-quality scanning system may be invoked to acquire an image of a product being reviewed by the AOI system. For example, a low-quality image may be captured by a camera sensor depicting the PCB or FPD that were manufactured at the site.

On Step 220, an enhanced-quality image is generated. The enhanced-quality image may be generated using the prediction model. The prediction model may be applied on the image obtained on Step 210, to predict the enhanced-quality image. In some exemplary embodiments, pre-processing of the low-quality image may be performed prior to applying the prediction model, to align the image in accordance with the expectancy of the prediction model (e.g., in case the training dataset was aligned in a similar manner). Additionally or alternatively, the predicted image of the model may be processed and transformed to provide the enhanced-quality image, such as by performing an inverse transformation to the transformation that was performed on the high-quality images of the training dataset.

On Step 230, defect detection may be applied on the enhanced-quality image. Defect detection may be performed by any means, such as but not limited to utilizing dedicated, user-tailored algorithms, applying classification engines, utilizing AI-based classification techniques, applying machine learning models, or the like. Based on the outcome of the defect detection, the AOI system may provide relevant output to the user, such as indicating defective products, providing a log of defects in products, indicating which products are defective and which are not, or the like. In some exemplary embodiments, products identified as defective may be discarded, automatically, manually, semi-automatically, or the like.

Figure 2B:
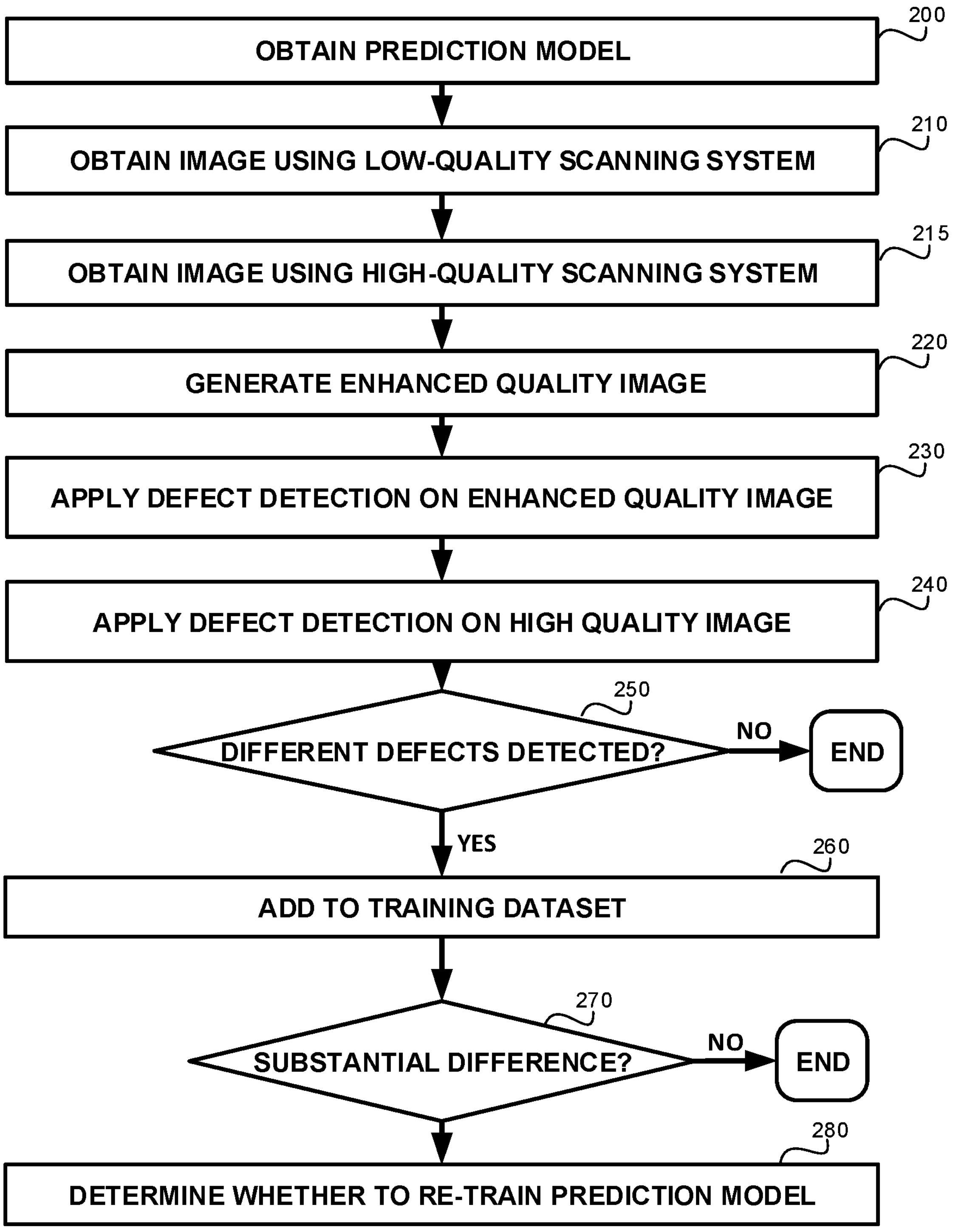

Referring now to FIG. 2B showing a flowchart diagram of a method, in accordance with some exemplary embodiments of the disclosed subject matter. The method of FIG. 2B may be performed by a computerized system having a dual quality scanning system (e.g., a high-quality scanning system and a low-quality scanning system), such as a teacher module.

On Step 215, a high-quality image of the same product for which a low-quality image was obtained on Step 210, may be obtained. The high-quality image may be obtained using the high-quality scanning system.

On Step 240, defect detection may be applied on the high-quality image obtained on Step 215. In some exemplary embodiments, the defect detection may be the same defect detection utilized on Step 230, a different defect detection mechanism, or the like. The list of defects detected on Step 230 may be denoted as $List_l=(d_1, d_2, \ldots, d_n)$, and the list of defects detected on Step 240 may be denoted as $List_h=(d_1, d_2, \ldots d_m)$. It is noted that each list may include different defects ($d_i$). Additionally or alternatively, the lists may be empty sets.

On Step 250, the defects identified on Steps 230 and 240 may be compared. In case the same defects were detected ($List_l=List_h$), including the case in which in both images no defects were detected, the method may end. However, if there is a difference in the lists ($List_l \neq List_h$), Step 260 may be performed.

On Step 260, the pair of images obtained on Steps 210 and 215 may be added to the training dataset. As the defect detection system identified different defects, the two images may be added to the training dataset to be used in re-training so as to improve the prediction model to allow for more accurate AI-based defect detection in the future. It is noted that re-training may utilize the original training dataset, portion thereof or discard it completely.

On Step 270, for evaluation purposes, it may be determined whether there is a substantial difference between the defects detected in both cases. In some exemplary embodiments, any difference may be considered a substantial difference. In such a case, the Step of 270 may be omitted (in view of the decision made in Step 250). Additionally or alternatively, substantial difference may be a difference where one defect list is empty and the other is not (e.g., $List_l=\varnothing \wedge List_h \neq \varnothing$, or $List_h=\varnothing \wedge List_l \neq \varnothing$). Additionally or alternatively, some defects may be considered of a same class, and two list comprising defects with the same classes, may be considered substantially identical (e.g., $\forall d_i \in List_l, \exists d_j \in List_h, s.t. class(d_i)=class(d_j) \wedge \forall d_j \in List_h, \exists_d \in List_l, s.t. class(d_i)=class(d_j)$). Additionally or alternatively, two lists may be considered substantially identical only if the lists comprise a same number of defects as ($|List_h|=|List_l|$) at the same (x,y) position in image space of PCB Panel Space. Additionally or alternatively, two lists may be considered substantially identical only if the lists comprise a similar number of defects within a threshold ($||List_h|-|List_l|| \leq threshold$). Additional metrics for determining substantial similarity may be utilized, based on combination of the above examples, based on additional metrics, or the like. In some exemplary embodiments, substantial difference between the two lists may correspond to a different outcome or operation to be performed with respect to the product. So that the AI-based detection yields a different outcome than that yielded based on the high-quality image. In some exemplary embodiments, a substantial difference may be regarded to as a difference of type false negative only. In a false negative scenario, the AI-based detection may falsely indicate that the product is non-defective although according to the high-quality image, there is at least one defect in the product. In such a case, the AOI system may fail to prevent the usage of a defective product. In some cases, false positive (e.g., erroneously indicating non-defective products as defective) may be considered acceptable in some scenarios or at some rates, while false negative may be unacceptable at all or acceptable at lower rates.

In some exemplary embodiments, in case there is substantial difference, Step 280 may be performed. A counter may be incremented and a decision may be made whether to re-train the prediction model. In some exemplary embodiments, after identifying a threshold number of substantial differences, the prediction model may be re-trained so as to prevent erroneous outcomes. Re-training may be performed using the method of FIG. 1 or a similar method.

Figure 3A:
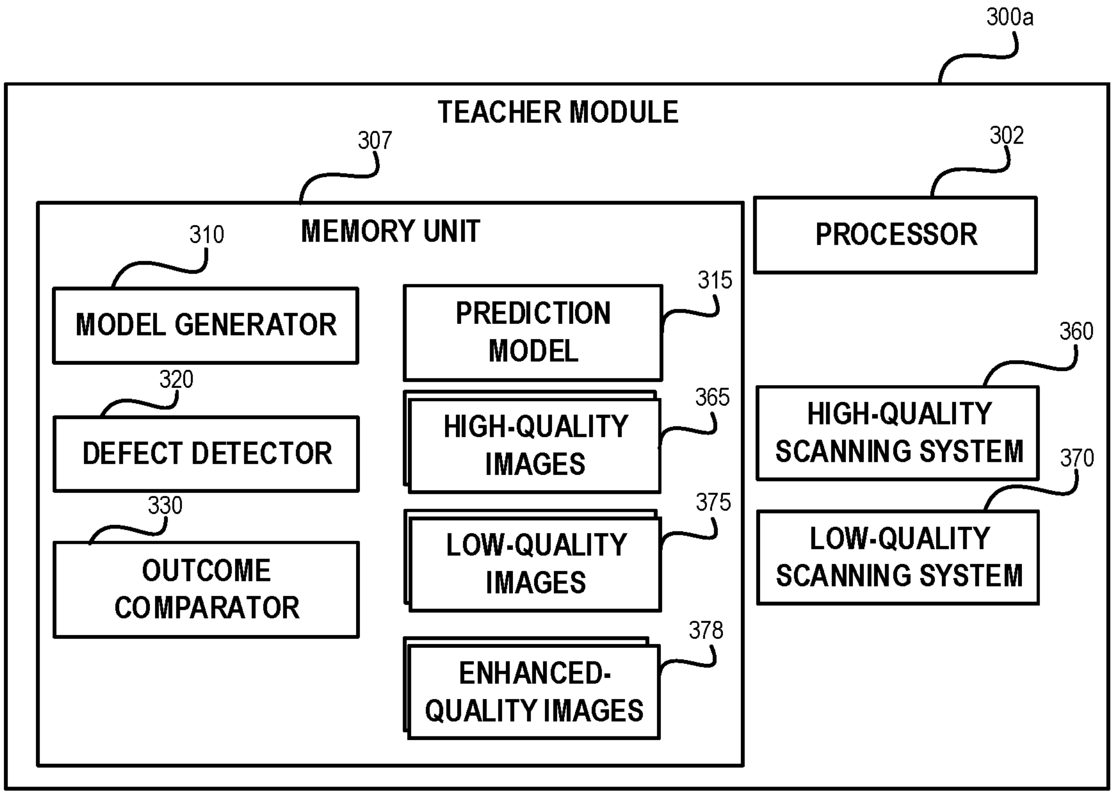
FIG. 3A shows a block diagram of an apparatus, in accordance with some exemplary embodiments of the disclosed subject matter.

Referring now to FIG. 3A, showing an apparatus, in accordance with some exemplary embodiments of the disclosed subject matter.

In some exemplary embodiments, Apparatus 300*a*, also referred to as Teacher Module, may comprise one or more Processor(s) 302. Processor 302 may be a Central Processing Unit (CPU), a microprocessor, an electronic circuit, an Integrated Circuit (IC) or the like. Processor 302 may be utilized to perform computations required by Apparatus 300*a* or any of it subcomponents.

In some exemplary embodiments of the disclosed subject matter, Apparatus 300*a* may comprise an Input/Output (I/O) Module (not shown). I/O Module may be utilized to provide an output to a user. Additionally or alternatively, I/O Module may be utilized to receive input from a user. Additionally or alternatively, I/O Module may be utilized to communicate with other devices, such as Student Module 300*b* of FIG. 3B, other teacher modules, remote servers, or the like.

In some exemplary embodiments, Apparatus 300*a* may comprise a High-Quality Scanning System 360 and a Low-Quality Scanning System 370. In some exemplary embodiments, Scanning Systems 360, 370 may be configured to scan electronic products that are inspected by an AOI process and provide high-quality and low-quality images, respectively. It is noted that the term "high-quality" and "low-quality" may be relative to one another. In some exemplary embodiments, the scanning system may be of the same type, e.g., both an optical camera sensor, both a video camera, or the like. Additionally or alternatively, the scanning system may be of different types, such as High-Quality Scanning System 360 may be an HD video camera, while Low-Quality Scanning System 370 may be an optical camera.

In some exemplary embodiments, Apparatus 300*a* may comprise Memory Unit 307. Memory Unit 307 may be a hard disk drive, a Flash disk, a Random Access Memory (RAM), a memory chip, or the like. In some exemplary embodiments, Memory Unit 307 may retain program code operative to cause Processor 302 to perform acts associated with any of the subcomponents of Apparatus 300*a*. Memory Unit 307 may comprise one or more components as detailed below, implemented as executables, libraries, static libraries, functions, or any other executable components. In some exemplary embodiments, Memory Unit 307 may be configured to Prediction Model 315, training dataset, sets of pairs of low-resolution image and high-resolution image of the same product obtained during learning phase, during production phase, or the like, Enhanced-Quality Images 378 generated thereby, or the like. In some exemplary embodiments, High-Quality Images 365 obtained by High-Quality Scanning System 360 may be retained by Memory Unit 307. Additionally or alternatively, Low-Quality Images 375 obtained by Low-Quality Scanning System 370 may be retained by Memory Unit 307.

In some exemplary embodiments, Model Generator 310 may be utilized to obtain training set comprising sets of pairs of images of the same products having different qualities (e.g., High-Quality Images 365, Low-Quality Images 375) and generate Prediction Model 315. In some exemplary embodiments, Model Generator 310 may be configured to train Prediction Model 315 in view of the training dataset. Additionally or alternatively, Model Generator 310 may utilize machine-learning-based techniques to train Prediction Model 315.

In some exemplary embodiments, Prediction Model 315 may be configured, after training, to predict an Enhanced-Quality Image 378 based on a Low-Quality Image 375.

In some exemplary embodiments, Defect Detector 320 may be configured to detect a defect in an image of a product. In some exemplary embodiments, Defect Detector 320 may be applied on High-Quality Images 365, Low-Quality Images 375, Enhanced-Quality Images 378, or the like. In some exemplary embodiments, Defect Detector 320 may utilize dedicated, user-tailored algorithms, classification engines, AI-based classification techniques, machine learning models, or the like to detect defects.

In some exemplary embodiments, Outcome Comparator 330 may be configured to compare defects detected by Defect Detector 320 on two images of the same product having different quality, such as High-Quality Image 365 and Enhanced-Quality Image 378.

In some exemplary embodiments, in response the Model Generator 310 generating Prediction Model 315, Prediction Model 315 may be distributed to other devices, such as other teacher modules, student modules, or the like.

Figure 3B:
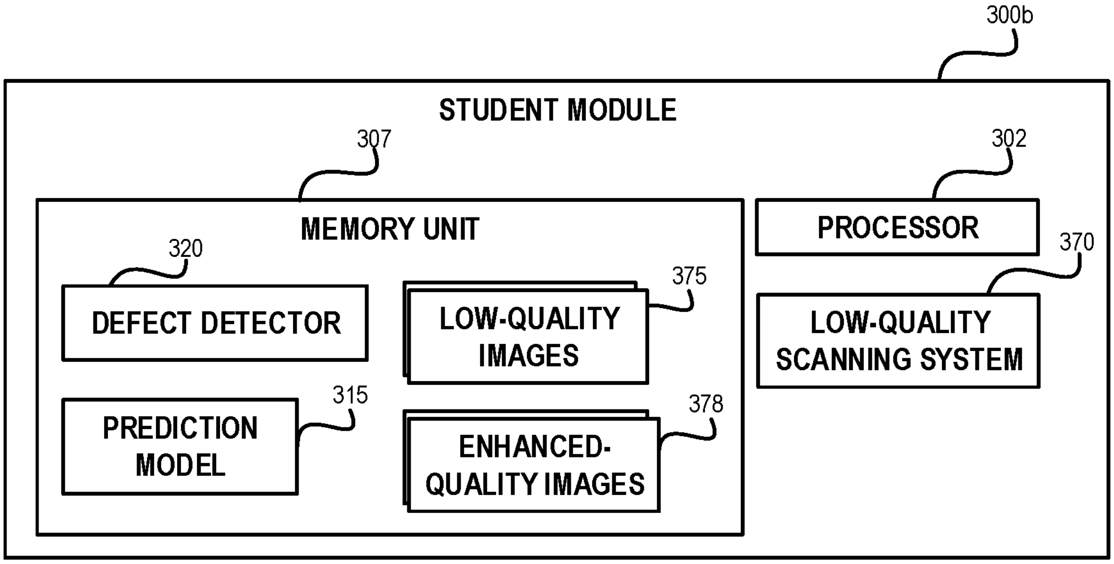
FIG. 3B shows a block diagram of an apparatus, in accordance with some exemplary embodiments of the disclosed subject matter.

Referring now to FIG. 3B, showing an apparatus, in accordance with some exemplary embodiments of the disclosed subject matter.

In some exemplary embodiments, Apparatus 300*b*, also referred to as Student Module, may comprise Processor 302, Low-Quality Scanning System 370, and Memory Unit 307. In some exemplary embodiments, as opposed to the dual-scanning system of Teacher Module 300*a*, Student Module 300*b* may comprise a single scanning system of relatively low-quality (370). In some exemplary embodiments, Student Module 300*b* may receive Prediction Model 315, trained based on data gathered by Teacher Module 300*a*, and utilize Prediction Model 315 to increase the quality of the scanned images from Low-Quality Images 375 to Enhanced-Quality Images 378. Defects may be detected by applying Defect Detector 320 to Enhanced-Quality Images 378, instead of on Low-Quality Images 375.

Figure 4:
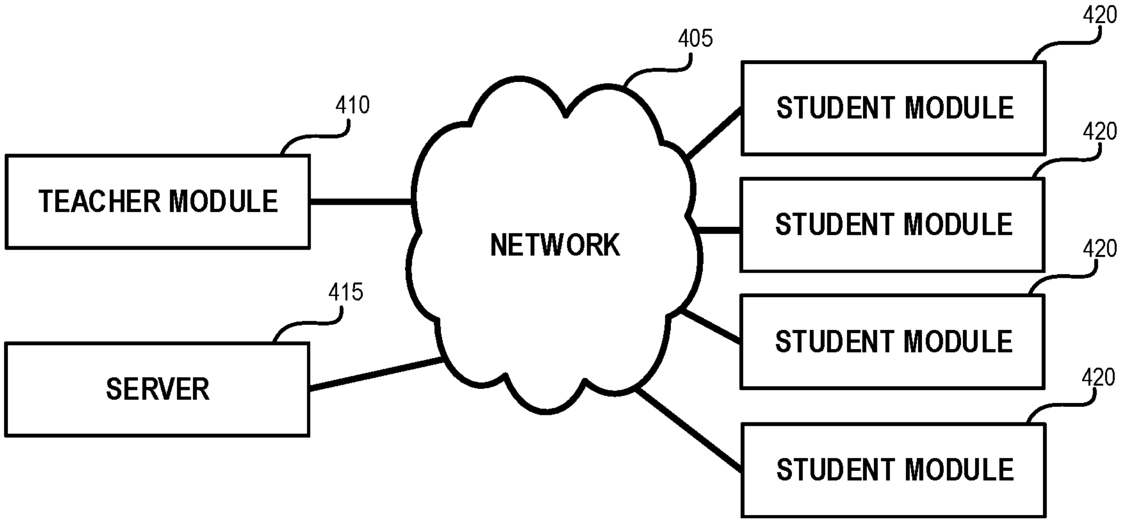

Referring now to FIG. 4 showing an illustration of a computerized environment, in accordance with some exemplary embodiments of the disclosed subject matter.

The computerized environment comprises Teacher Module 410, such as 300*a* of FIG. 3A, and a plurality of Student Modules 420, such as 300*b*. It is noted that there may be a plurality of Teacher Modules 410 as well. In some exemplary embodiments, the number of Teacher Modules 410 may be smaller than the number of the lower-cost Student Modules 420 that are utilized in the same environment.

In some exemplary embodiments, Teacher Module 410 may be utilized to obtain training data utilized for generating the prediction model. The prediction model may be a generated on Teacher Module 410, utilizing locally available pairs of images. In some exemplary embodiments, other teacher modules (not shown) may transmit data collected thereby to Teacher Module 410 to be utilized in the generation of the prediction model. Additionally or alternatively, the generation of the prediction model may be performed by a Server 415, which may be a local or a remote server. Server 415 may receive the data collected by Teacher Modules 410, such as via Network 405, and utilize such data to generate the prediction model.

In some exemplary embodiments, after the prediction model is generated (e.g., by Teacher Module 410 or by Server 415), the prediction model may be distributed to other modules in the environment, such as other teacher modules, Student Modules 420, or the like.

In some exemplary embodiments, during production process, evaluation of the quality of prediction may be performed by some of the Teacher Modules 410, by all Teacher Modules 410, or the like. In some exemplary embodiments, discrepancy between detection mage using high-quality images and enhanced-quality images may be retained for training purposes. In some exemplary embodiments, retraining may be invoked after a condition is met, such as determining substantial difference between defects detected in both cases, detecting a ratio above a threshold in the number of products for which substantial differences are identified in comparison to the number of products analyzed, detecting an absolute number of products for which there is a substantial difference between defects detected in both cases, or the like.

In some exemplary embodiments, Teacher Module 410 and Student Modules 420 may be deployed in the same customer site. Additionally or alternatively, all Modules 410,420 may be utilized as part of an AOI process of the same type of electronic product.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable a storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming a languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:

obtaining a prediction model, wherein the prediction model is configured to predict enhanced-quality images of products based on low-quality images of the products, wherein the prediction model is generated based on pairs of images obtained by a dual-scanning system comprising a low-quality scanning system and a high-quality scanning system;

utilizing the low-quality scanning system to capture a low-quality image of a product;

predicting, based on the low-quality image of the product and using the prediction model, an enhanced-quality image of the product, wherein the enhanced-quality image has a higher quality than a quality of the low-quality image;

performing defects detection on the enhanced-quality image without utilizing the high-quality scanning system, wherein said utilizing, said predicting and said performing the defects detection is performed by a teacher module, wherein the teacher module comprises the dual-scanning system comprising the low-quality scanning system and the high-quality scanning system; and performing results evaluation of the defects detection with the teacher module, wherein said performing results evaluation comprising:

utilizing the high-quality scanning system to capture a high-quality image of the product;

performing defects detection on the high-quality image; and comparing results between said performing defects detection on the high-quality image and said performing defects detection on the enhanced-quality image.

2. The method of claim 1, wherein the low-quality scanning system is faster than the high-quality scanning system, thereby detecting defects at shorter time in comparison to defect detection that is based on high-quality images obtained using the high-quality scanning system.

3. The method of claim 1, wherein said comparing results comprises identifying substantial difference between defects detected using the high-quality image and defects detected using the enhanced-quality image.

4. The method of claim 3, wherein said identifying substantial difference comprises determining lack of substantial difference in response to detecting two different non-empty sets of defects.

5. The method of claim 1 further comprising in response to determining a difference in the results, adding the low-quality image and the high-quality image to a training dataset to be used for re-training the prediction model.

6. The method of claim 1, wherein said obtaining the prediction model comprises:

obtaining a set of pairs of low-quality and high-quality images of products, obtained using the dual-scanning system, wherein said obtaining the set of pairs is performed at a customer site; and training the prediction model using the set of pairs of low-quality and high-quality images of products, thereby generating the prediction model;

wherein said utilizing the low-quality scanning system to capture the low-quality image of the product is performed at the customer site.

7. The method of claim 1, wherein the enhanced-quality image has a lower quality than a quality of images obtained by the high-quality scanning system.

8. A system comprising:

one or more teacher modules, wherein each teacher module comprises a dual-scanning system comprising a low-quality scanning system and a high-quality scanning system configured to obtain low-quality and high-quality images of a scanned product, respectively;

a plurality of student modules, wherein each student module comprising the low-quality scanning system;

a model generator configured to generate a prediction model, wherein the prediction model is configured to predict, based on a low-quality image of a product, an enhanced-quality image of the product, wherein the enhanced-quality image has a higher quality than a quality of the low-quality image; and a defects detector configured to detect defects using automated optical inspection of an image of products, wherein said defects detector is configured to detect defects in enhanced-quality images predicted by the prediction model, wherein at least one of the teacher modules is configured to perform results evaluation of defects detection with the teacher module, wherein said performing results evaluation comprises:

utilizing the high-quality scanning system to capture a high-quality image of the product;

performing defects detection on the high-quality image; and comparing results between said performing defects detection on the high-quality image and said performing defects detection on the enhanced-quality image.

9. The system of claim 8, wherein a number of said one or more teacher modules is smaller than a number of the plurality of student modules.

10. The system of claim 8, wherein said one or more teacher modules and said plurality of student modules are deployed at a customer site.

11. The system of claim 8, wherein the low-quality scanning system is faster than the high-quality scanning system.

12. The system of claim 8, wherein said one or more teacher modules are configured to be utilized for gathering a training dataset to be used by said model generator, wherein said plurality of student modules are configured to be utilized for performing the automated optical inspection using images obtained by the low-quality scanning system.

13. The system of claim 12, wherein said one or more teacher modules are configured to be utilized for performing the automated optical inspection using images obtained by the low-quality scanning system and without utilizing the high-quality scanning system.

14. A computer program product comprising a non-transitory computer readable storage medium retaining program instructions, which program instructions when read by a processor, cause the processor to perform:

obtaining a prediction model, wherein the prediction model is configured to predict enhanced-quality images of products based on low-quality images of the products, wherein the prediction model is generated based on pairs of images obtained by a dual-scanning system comprising a low-quality scanning system and a high-quality scanning system;

utilizing the low-quality scanning system to capture a low-quality image of a product;

predicting, based on the low-quality image of the product and using the prediction model, an enhanced-quality image of the product, wherein the enhanced-quality image has a higher quality than a quality of the low-quality image;

performing defects detection on the enhanced-quality image without utilizing the high-quality scanning system; and performing results evaluation of defects detection with a teacher module, wherein said performing results evaluation comprises:

performing defects detection on a high-quality image captured by the high-quality scanning system; and comparing results between said performing defects detection on the high-quality image and said performing defects detection on the enhanced-quality image.

15. The computer program product of claim 14, wherein the low-quality scanning system is faster than the high-quality scanning system, thereby detecting defects at shorter time in comparison to defect detection that is based on high-quality images obtained using the high-quality scanning system.

16. The computer program product of claim 14, wherein said utilizing, said predicting and said performing the defects detection is performed by a student module, wherein the student module comprising the low-quality scanning system and devoid of the high-quality scanning system.

17. The computer program product of claim 14, wherein said utilizing, said predicting and said performing the defects detection is performed by the teacher module, wherein the teacher module comprising the dual-scanning system comprising the low-quality scanning system and the high-quality scanning system.

18. The computer program product of claim 14, wherein said obtaining the prediction model comprises:

obtaining a set of pairs of low-quality and high-quality images of products, obtained using the dual-scanning system, wherein said obtaining the set of pairs is performed at a customer site; and training the prediction model using the set of pairs of low-quality and high-quality images of products, thereby generating the prediction model;

wherein said utilizing the low-quality scanning system to capture the low-quality image of the product is performed at the customer site.

19. The computer program product of claim 14, wherein the enhanced-quality image has a lower quality than a quality of images obtained by the high-quality scanning system.

* * * * *